United States Patent

[11] 3,620,605

| [72] | Inventor | James D. Clark<br>Berkeley, Calif. |
|---|---|---|
| [21] | Appl. No. | 121,595 |
| [22] | Filed | Mar. 5, 1971 |
| [45] | Patented | Nov. 16, 1971 |
| [73] | Assignee | Paul of Hawaii, Inc.<br>Continuation of application Ser. No.<br>771,013, Oct. 28, 1968, now abandoned.<br>This application Mar. 5, 1971, Ser. No.<br>121,595 |

[54] EYE MIRROR
5 Claims, 5 Drawing Figs.

[52] U.S. Cl. .................................................. 350/305
[51] Int. Cl. .................................................. G02b 5/08
[50] Field of Search .......................... 240/4.1,
4.2; 350/288, 299, 301, 305, 306

[56] References Cited
UNITED STATES PATENTS

| 2,309,544 | 1/1943 | Scharff | 350/305 |
| 2,668,477 | 2/1954 | Shaikun | 350/305 |

*Primary Examiner*—David Schonberg
*Assistant Examiner*—Michael J. Tokar

ABSTRACT: An optical device for viewing the eye of an observer simultaneously from three different vertical angles for the purpose of applying cosmetics in which an upper and lower mirror are arranged at an angle of from 98° to 122° with a vertical mirror, which mirror arrangement is mounted in an open end container incorporating a means for illuminating the eye area.

PATENTED NOV 16 1971

INVENTOR.
JAMES D. CLARK

BY
Bruce, Meloy & Tipton

ATTORNEYS

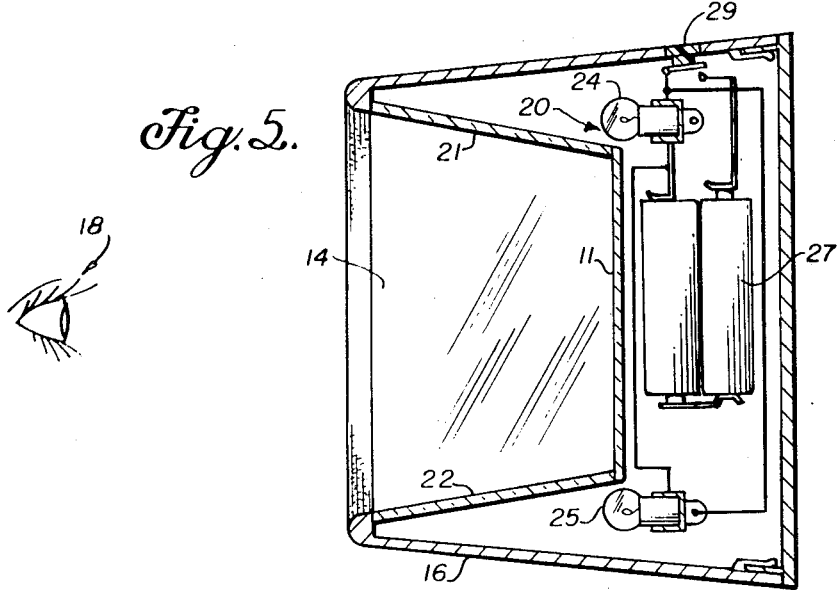
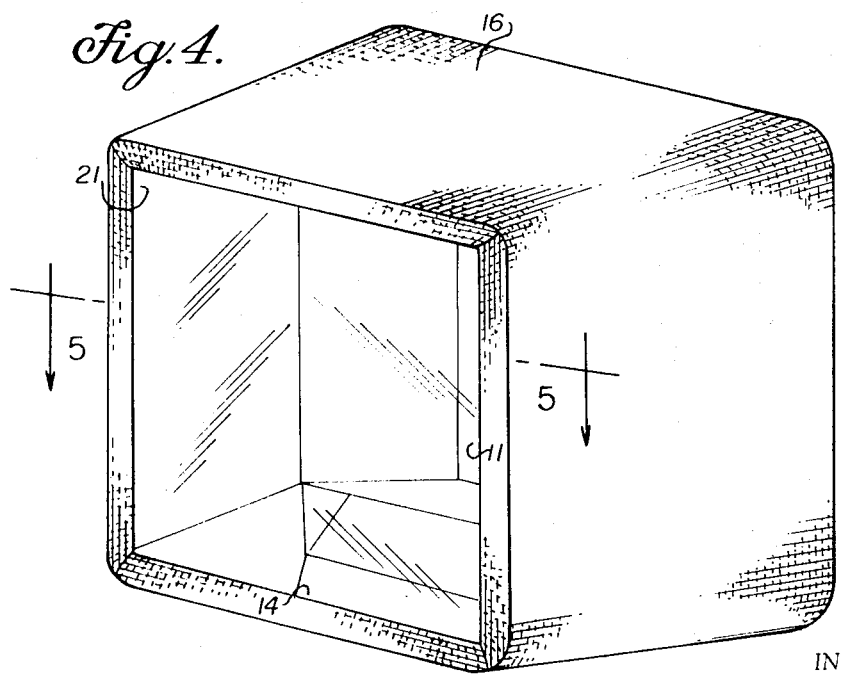

EYE MIRROR

This is a continuation of application Ser. No. 771,013 filed Oct. 28, 1968, now abandoned.

BACKGROUND OF THE INVENTION

This invention relates generally to optics and in particular to eye examination devices using reflectors with offset or spaced-apart surfaces.

With the increased use of eye cosmetics and artificial eye lashes, the single plain mirror found in the usual ladies compact, since it affords only one viewing angle, is generally inadequate for the precise application of false eyelashes, contact lenses and eye makeup generally.

SUMMARY OF THE INVENTION

The eye-viewing device of the present invention incorporates three mirrors or reflections set at specifically defined angles relative to each other and disposed in a manner one above the other to provide an observer, looking into the mirror arrangement, a view of his eye from three different vertical angles, i.e., top, front and bottom views. The size, angle and distance the mirrors are spaced apart are critically established so that all three views of the observer's eye can be seen simultaneously with only slight movement of the observer's eyeball.

It is, therefore, an object of the present invention to provide a device for an observer to examine his eye simultaneously from three different vertical angles.

It is another object of this invention to provide a device for an observer to examine his eye which can be held in the observer's hand.

It is a further object of this invention to provide a device for an observer to examine his eye in which illuminates the eye.

Other and more particular objects of this invention will be apparent upon study of the following detailed description when taken together with the drawings.

BRIEF DESCRIPTION OF THE DRAWINGS

FIG. 4 is an isometric view of the mirror arrangement as installed in a housing for holding in the hand of an observer;

FIG. 5 is a section through the housing and mirror arrangement of FIG. 4 taken at line 5—5.

DESCRIPTION OF THE PREFERRED EMBODIMENT

Figure 1:
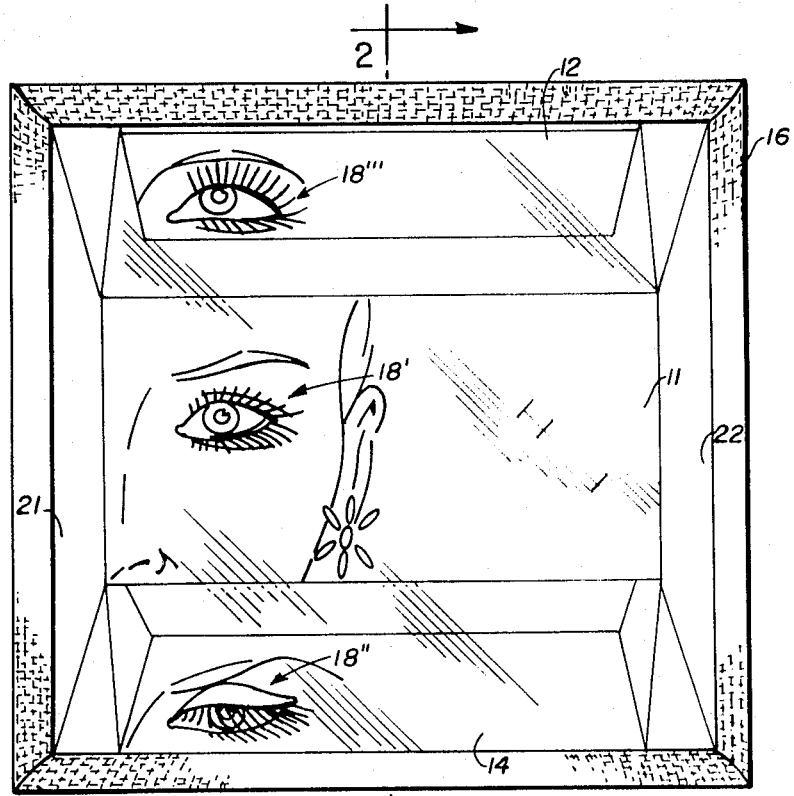
FIG. 1 is an illustration of the mirror arrangement when looking into the device and showing the images seen by the observer.

With reference to FIG. 1, the device of the present invention comprises a first mirror or reflecting surface 11 facing the observer (viewer), an upper mirror or reflecting surface 12 disposed along the upper edge of first mirror 11 with its reflecting surface facing down and a lower mirror or reflecting surface 14 disposed along the lower edge of first mirror 11 with its reflecting surface facing up.

The mirror arrangement is mounted in an open-ended housing 16, showing, in the present embodiment, a cloth covering in order to soften the sharp edges of the housing opening.

Figure 2:
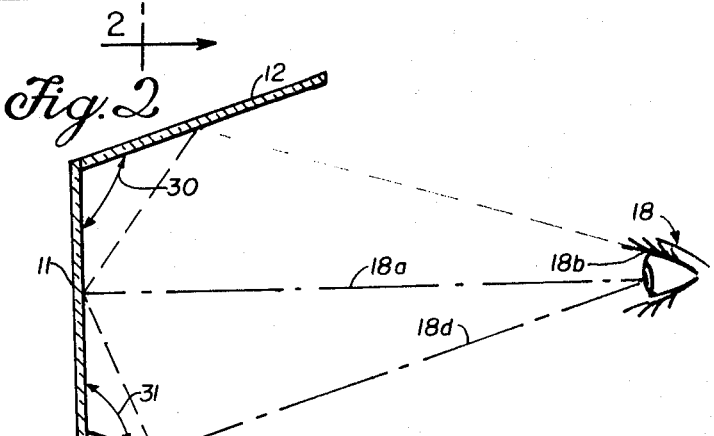
FIG. 2 is a section through the mirror arrangement taken at line 2—2 showing the line of sight of the observer looking at the top of his upper eyelid.
Figure 3:
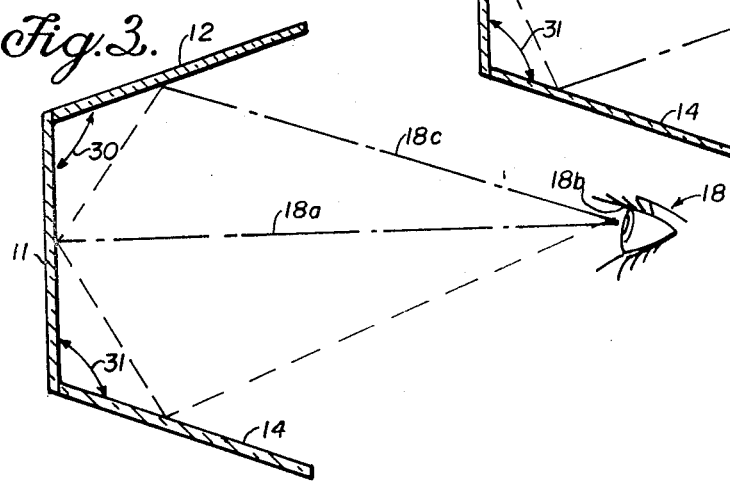
FIG. 3 is a section through the mirror arrangement taken at line 2—2 showing the line of sight of the observer looking at the underside of his upper eyelid.

With reference to FIGS. 2 and 3, the detailed arrangement of the mirrors and the critical angle that mirrors 12 and 14 make with mirror 11 is shown.

Mirror 11 is placed so that it is about one-half to one-quarter the normal reading distance of the observer away from the observer's eye 18. Since the focusing distance of eye 18 is twice the distance between the observer's eye 18 and mirror 11 due to the reflected image, no additional lenses or magnifying means are needed to compensate for the natural ability of eye 18 to focus on the images it sees in the mirror.

For the eye mirror of the present invention, it has been found that, for the normal eye, that upper angle 30 and lower angle 31 can range from 98° to 122° for a spacing between mirrors 12 and 14 measured along mirror 11 of from 1½ to 2½ inches, the height of mirrors 12 and 14 measured from mirror 11 ranging from 1½ to 2½ inches. It has also been found that for the same size mirrors and mirror spacing upper and lower angles 30 and 31 can also range from 103° to 113° with the best angle ranging from 106° to 110°.

With reference to FIG. 1, an observer when looking into the mirror arrangement described above viewed from a distance to permit the use of normal reading vision will see three images of the observer's eye and surrounding area namely eye image 18' as seen in mirror 11, eye image 18", as seen in mirror 12, and eye image 18''' as seen in mirror 14.

Referring now to FIG. 2, eye image 18' is a straight-on view of eye 18 as indicated by sight line 18a. Image 18" is a view of eye 18 looking down on the upper part of eyelid 18b following sight line 18d as it is reflected from lower mirror 14 to first mirror 11 to upper mirror 12 and then to the upper side of eyelid 18b.

Referring now to FIG. 3, image 18''' is a view of eye 18 looking up to the underside of eyelid 18b following sight line 18c as it is reflected from upper mirror 12 to first mirror 11 to lower mirror 14 and then to the underside of eyelid 18b.

The eye mirror of the present invention is used by holding mirror 11, as stated above, about one-half the normal reading distance away from eye 18 with mirror 12 in top relative to the observer and mirror 14 on the bottom relative to the observer. The eye 18 of the observer can then look down into lower mirror 14 to see eyelid 18b from the top or look up and see his eyelid 18b from the bottom by merely moving his eyeball up or down.

It will be noted that the natural movement of eyelid 18b to lower or close when looking down, and rise or open when looking up is utilized by the device of the present invention in that, to look at the top of eyelid 18b, the observer must look down causing eyelid 18b to lower or close, thus further exposing it to view. In a similar manner, looking up into upper mirror 12 to the underside of eyelid 18b causes eyelid 18b to rise thus further exposing the underside of eyelid 18b to view.

With reference to FIG. 5, a cross section of container 16 is shown exposing the means 20 for illuminating the observers's eye 18.

Illumination means 20 comprises a first translucent panel 21 along one side of mirror 11 between mirrors 12 and 14, a second translucent panel 22 along the opposite side of mirror 11 between mirrors 12 and 14, a first light source 24 behind panel 21, a second light source 25 behind panel 22 and a power source 27, in the present embodiment, a pair of batteries, connected to light source 24 and 25 and controlled by switch 29. When the mirror arrangement of FIG. 5 is placed in front of eye 18 and switch 29 is depressed to energize light sources 24 and 25 the light from these sources will diffuse through panels 21 and 22 and tend to illuminate eye 18 both by light coming directly from the panels as well as light which is interreflected from mirrors 11, 12 and 14.

Thus is described an optical device whereby an observer can view his eye simultaneously from three different vertical angles.

What is claimed is:

1. An optical device for viewing the upper and lower eyelids of the eyes of an observer, said device comprising a first mirror, an upper mirror disposed above said first mirror relative to said observer, a lower mirror disposed below said first mirror relative to said observer, and means fixing the angle and position of said upper and lower mirrors with respect to said first mirror whereby said observer may view his lower and upper eyelids by looking at said upper and lower mirrors respectively when viewing his eye at a distance less than normal reading distance wherein said upper and lower mirrors are disposed along the upper and lower edges of said first mirror respectively.

2. An optical device as set forth in claim 1 wherein the angle of said upper and lower mirrors to said first mirror is between 98° and 122°.

3. An optical device as set forth in claim 1 wherein the angle of said upper and lower mirrors to said first mirror is between 103° and 110°.

4. An optical device as set forth in claim 1 wherein the angle of said upper and lower mirrors to said first mirror is between 106° and 110°.

5. An optical device for viewing the eyes of an observer simultaneously from three different angles comprising a first mirror, and upper and lower mirrors along the upper and lower edges respectively of said first mirror relative to said observer, means fixing the angle of said upper and lower mirrors relative to said first mirror between 98° and 122°, said first mirror being between 1½ and 2½ inches high whereby the proximate edges of said upper and lower mirrors are spaced apart a distance sufficient for said observer to see his eye in all three of said mirrors simultaneously when viewing his eye at a distance from about one-half to one-fourth the normal reading distance.

* * * * *

UNITED STATES PATENT OFFICE
CERTIFICATE OF CORRECTION

Patent No. 3,620,605   Dated November 16, 1971

Inventor(s) James D. Clark

It is certified that error appears in the above-identified patent and that said Letters Patent are hereby corrected as shown below:

Column 3, last line "110°" should read -- 113° --.

Signed and sealed this 31st day of October 1972.

(SEAL)
Attest:

EDWARD M. FLETCHER, JR.
Attesting Officer

ROBERT GOTTSCHALK
Commissioner of Patents